United States Patent
Simske et al.

(10) Patent No.: US 10,621,688 B2
(45) Date of Patent: Apr. 14, 2020

(54) M-ARY CYCLIC CODING

(71) Applicant: Hewlett-Packard Development Company, L.P., Houston, TX (US)

(72) Inventors: Steven J Simske, Ft. Collins, CO (US); Robert Ulichney, Stow, MA (US); Matthew D Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 192 days.

(21) Appl. No.: 15/545,708

(22) PCT Filed: Jan. 30, 2015

(86) PCT No.: PCT/US2015/013695
§ 371 (c)(1),
(2) Date: Jul. 23, 2017

(87) PCT Pub. No.: WO2016/122567
PCT Pub. Date: Aug. 4, 2016

(65) Prior Publication Data
US 2018/0005342 A1    Jan. 4, 2018

(51) Int. Cl.
*G06T 1/00* (2006.01)
*G06K 19/06* (2006.01)

(52) U.S. Cl.
CPC ...... *G06T 1/0071* (2013.01); *G06K 19/06018* (2013.01); *G06K 19/06037* (2013.01); *G06T 2201/0051* (2013.01)

(58) Field of Classification Search
CPC combination set(s) only.
See application file for complete search history.

(56) References Cited

U.S. PATENT DOCUMENTS

| 5,442,147 A | 8/1995 | Burns et al. |
| 5,852,434 A | 12/1998 | Sekendur |

(Continued)

FOREIGN PATENT DOCUMENTS

| CN | 1377487 | 10/2002 |
| CN | 1377488 | 10/2002 |

(Continued)

OTHER PUBLICATIONS

"About High Capacity Color Barcode Technology".
(Continued)

*Primary Examiner* — Anand P Bhatnagar
(74) *Attorney, Agent, or Firm* — Tong, Rea, Bentley & Kim LLC

(57) ABSTRACT

An example method is described in which a processor receives a first plurality of symbols selected from a first set of symbols, translates the first plurality of symbols into a second plurality of symbols selected from an M-ary cyclic symbol set, and writes the second plurality of symbols to a surface. An additional example method is described in which a processor captures an image of at least a portion of a surface, detects a first plurality of symbols from the image, where the first plurality of symbols comprises symbols selected from an M-ary cyclic symbol set, translates the first plurality of symbols into a second plurality of symbols selected from a second set of symbols, and performs at least one task responsive to the second plurality of symbols.

13 Claims, 9 Drawing Sheets

(56) References Cited

U.S. PATENT DOCUMENTS

| | | | | |
|---|---|---|---|---|
| 6,182,901 | B1* | 2/2001 | Hecht | G06K 7/14 235/487 |
| 6,570,104 | B1 | 5/2003 | Ericson et al. | |
| 6,594,406 | B1* | 7/2003 | Hecht | G06F 3/002 382/306 |
| 7,284,129 | B2* | 10/2007 | Pelly | G06T 1/0071 380/201 |
| 8,118,235 | B2 | 2/2012 | Lapstun | G06K 19/06037 235/487 |
| 8,126,196 | B2* | 2/2012 | Lapstun | G06K 19/06037 235/494 |
| 8,181,885 | B2* | 5/2012 | Lapstun | G06K 19/06037 235/435 |
| 8,282,016 | B2* | 10/2012 | Lapstun | G06K 7/10772 235/375 |
| 8,286,890 | B2* | 10/2012 | Lapstun | G06K 19/06037 235/454 |
| 8,320,678 | B2* | 11/2012 | Lapstun | G06F 3/03545 235/472.01 |
| 8,328,109 | B2* | 12/2012 | Lapstun | G06K 7/10772 235/456 |
| 8,397,141 | B2* | 3/2013 | Lapstun | G06K 19/06037 714/774 |
| 8,489,956 | B2* | 7/2013 | Yokokawa | H03M 13/1137 714/752 |
| 8,590,791 | B2 | 11/2013 | Haas et al. | |
| 9,703,404 | B2* | 7/2017 | Kimura | G06F 3/041 |
| 2007/0075151 | A1 | 4/2007 | Ericson | |
| 2008/0240595 | A1 | 10/2008 | Le Hanne | |
| 2010/0005368 | A1 | 1/2010 | Lee | |
| 2011/0180602 | A1* | 7/2011 | Napper | G06K 7/14 235/454 |
| 2011/0320917 | A1* | 12/2011 | Lapstun | G06F 3/0317 714/781 |
| 2013/0175349 | A1* | 7/2013 | Lapstun | G06K 7/10772 235/494 |
| 2018/0137320 | A1* | 5/2018 | Gaubatz | G06K 7/143 |

FOREIGN PATENT DOCUMENTS

| | | |
|---|---|---|
| CN | 1494675 | 5/2004 |
| CN | 1520575 | 8/2004 |
| CN | 1691052 | 11/2005 |
| CN | 1238782 | 1/2006 |
| CN | 1806249 | 7/2006 |
| CN | 101515335 A | 8/2009 |
| CN | 102171708 | 8/2011 |
| CN | 103310255 A | 9/2013 |
| WO | WO-2008064644 A2 | 6/2008 |

OTHER PUBLICATIONS

Jiahui, Pan et al, "Color N-ary Gray Code for 3D Shape Measurement", Aug. 29-Sep. 2, 2004.

M. Querini et al, "2D Color Barcodes for Mobile Phone" 2011.

* cited by examiner

| INDEX: FEATURE: | 0 | 1 | 2 | 3 | 4 |
|---|---|---|---|---|---|
| COLOR 310 | W | C | M | Y | B |
| SIZE 320 | | | | | |
| POSITION 330 | | | | | |
| ANGLE 340 | | | | | |
| GLYPH 350 | A | B | C | D | E |

FIG. 3

M-ARY CYCLIC CODING

BACKGROUND

Embedding data in hardcopy is increasingly important for content linking, security, and other applications. Data-bearing hardcopy is most often accomplished with various types of multidimensional barcodes, along with more aesthetically pleasing alternatives of encoding symbols in halftones.

BRIEF DESCRIPTION OF THE DRAWINGS

FIG. 3 illustrates an example chart comprising examples of M-ary cyclic symbol sets;

DETAILED DESCRIPTION

Figure 1:
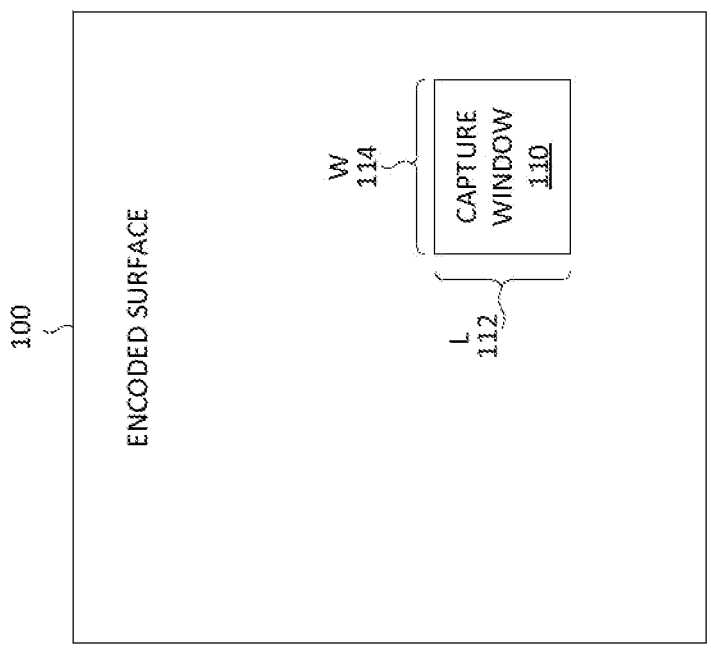
FIG. 1 illustrates an example surface encoded with a pattern of M-ary cyclic symbols.

Examples of the present disclosure encode information in a pattern written to a surface, where the pattern comprises symbols selected from a set of M-ary cyclic symbols. M-ary cyclic symbols comprise sets of M values selected from a cyclic symbol space. A cyclic symbol space is one where values in the space increase monotonically until a limit is reached, at which point the values in the space returns to the smallest value in the space. In an M-ary cyclic symbol set, the M symbols are ordered, and the arrangement each of the M symbols within the order is denoted by an index in the range $[0,(M-1)]$, where the symbol with the maximum index $(M-1)$ is followed by the zero-index symbol. The value of the symbol associated with each index may be some representative quantity (an angle, a color, a size, etc.), which, in some cases, may even be the index itself. The index representation of the symbols is particularly useful when mapping a string represented by symbols in a possibly different number system to a string of base-M symbols. A string of symbols selected from the set of M symbols may then be written to a surface in a repeating pattern in two dimensions. In one example, the M symbols are represented by colors. In another example, the M symbols are represented by sizes of an icon, positions of an icon, slopes or angles of a line, or alphanumeric glyphs. When the pattern is repeated on the surface, an image capture device can determine the string by capturing any sufficiently large portion of the surface, without having to know the boundaries of the pattern beforehand.

In one example, the pattern may be successively shifted or "perturbed," over each repeated version of the pattern on the surface in order to further encode information or provide a visual effect. For example, an original instance of the pattern may comprise a number of modified or non-modified versions of a string representing a set of information to be encoded. In addition, each instance of the pattern may comprise a modified version of the original pattern, where each symbol in the pattern is modified by a number of cyclic value shifts. A cyclic value shift may be represented by an index difference in the M-ary cyclic symbol set as compared to a prior instance of the pattern. Thus, a cyclic value shift may comprise a change in the value of a symbol (where values range from 0 to M-1). In one example, the M-ary cyclic symbol set may be represented mathematically by indices or angles around a unit circle. In such case, cyclical shifts may be represented by a value difference (e.g., an angular value difference) between the angles/indices of two symbols. The value of the cyclical shift may represent some form of information, or the cyclical shift may be used to avoid visual artifacts on the page or to correct visual artifacts. In some cases, the M-ary cyclic encoding may utilize intermediate symbol values within a cyclic space. For instance, a continuous cyclic space may be defined over 360 degrees, or $2\pi$ radians. An M-ary cyclic symbol set may then be defined as angular shifts within the continuous cyclic space. The M-ary cyclic symbol set may then be represented on a printed page with printed symbols that have no direct relation to the angular quantities that define the M-ary cyclic symbol set.

The M-ary cyclic coding of the present disclosure may also be used in conjunction with circular coding of a string, and circular shift coding of the repeated versions of the pattern in the two-dimensions of the surface. In circular coding, a string may be translated into "standard form" by shifting symbols in the string bitwise, or digit-wise, in a circular rotation (where symbols from the end of the string wrap back to the beginning through a shifting operation). The shifted version of the original string having the lowest value in the relevant numerical system, or "number system," is referred to as the "standard form." The number of digit shifts that are required to transform the original string to the standard form is referred to as the "phase." If the string is of length N, a reading device may capture any sequence of N-digits, and it is guaranteed that the standard form may be recovered. If the phase is known in advance, or can be encoded to the surface in some way, the original string may also be recovered. As such, circular coding in the two-dimensional printed space may be utilized in conjunction with an encoding scheme that uses an M-ary cyclic symbol set to represent information. This arrangement provides several advantages, such as providing additional redundant information for error checking, allowing more information to be conveyed within the same two dimensional space, and so forth. The concept of "standard form" also has a corollary in the cyclic symbol space, as described in greater detail below in connection with the example of FIG. 5.

As mentioned above, in one example, the present disclosure represents a message comprising a discrete set of information as a string, or sequence, where a pattern derived from the string is repeated across a surface, e.g., a 2-D planar surface, such as a poster-sized piece of paper, and where the original message can be determined by a reading device from only a subsection of the repeated pattern. To illustrate, FIG. 1 shows a surface 100 that is encoded with a repeated pattern comprising symbols selected from an M-ary cyclic symbol set. In one example, the surface 100 comprises an ink-printable surface, a lithographically writeable surface, an optically writeable surface, or a display screen. A capture window 110 may have a length (L) 112 and a width (W) 114. If the size of the capture window 110 is too small, the entire original message cannot be reconstructed. The smallest achievable size where the message can be reconstructed is, in general, a function of the specifics of the encoding scheme. One of the benefits of this approach is that, assuming the size of the capture window 110 is sufficiently large, the original message can be reconstructed regardless of what part of the encoded surface is sampled. In one example, the capture window 110 corresponds to, for instance, the area of the surface 100 that can be imaged at close range with a digital camera, e.g., a standalone device, a camera in a mobile phone, and so forth.

Circular coding refers to a coding scheme where any sequence, or string, of B symbols can be represented by a circularly shifted version of the sequence. A circular shift is also referred to as bitwise rotation in the field of computer programming. For example, a circular shift is an operator that shifts each bit of an operand string by a particular number of symbols, or positions in the sequence of B symbols. Any symbols in the string that are vacated at a first end of the string during the shifting operation are filled in with the symbols that are shifted out of the second end of the sequence. Thus, the symbols of the second end of the string are "wrapped around" back to the beginning, or the first end of the string. If a string is B symbols in length, there are up to B−1 different circularly shifted versions of the original string. A standard form of a string is a circularly shifted version of the string that has the smallest value. The phase is the number of circular positional shifts required to transform the original string to the standard form.

To illustrate, a senary (6-ary) set of symbols may comprise colors red (R), yellow (Y), green (G), cyan (C), blue (B), and magenta (M), where colors in the set {R,Y,G,C,B,M} are mapped to the indices {0,1,2,3,4,5}. If an original message in binary format comprises $(1011011101)_2$, then the message translated from binary form to senary form is $(3221)_6$. Using the color representations above, this string may be written to a surface as CGGY (cyan, green, green, yellow). However, the senary form of the string may also be translated into the standard form, which is the circularly shifted version of the string that has the least value. In this case, the standard form is the minimum of $\{(3221)_6, (1322)_6, (2132)_6, (2213)_6\}$. Thus, $(1322)_6$ is the standard form. The phase shift is equal to "1," since a right shift of one digit, or symbol position is required to transform the original senary string into the standard form.

Circular coding may also be used to create two-dimensional arrays with repeating patterns of circularly shifted versions of a string. In one example, for each row of an array, digits of the string are repeated until the end of the row. For each successive row, the symbol values within the string are circularly shifted by D digits relative to the row above. In one example, the value of D is used to convey the phase. As such, an image capture device can capture a portion of the array which will have some number of repetitions of the string in successive circular-shifted forms. It has been demonstrated that the inter-row phase shift and the standard form can be determined using statistical methods, such as a blind estimation technique, if a sufficient portion of the array is captured by the image capture device. Thus, a transformation from the standard form to the original string can be made based only upon information gleaned from the two-dimensional array. Circular coding in conjunction with M-ary cyclic symbol sets is described in greater detail below in connection with the examples of FIG. 6. Blind estimation techniques are described in greater detail below in connection with the discussion of block 820 of FIG. 8.

Figure 2:
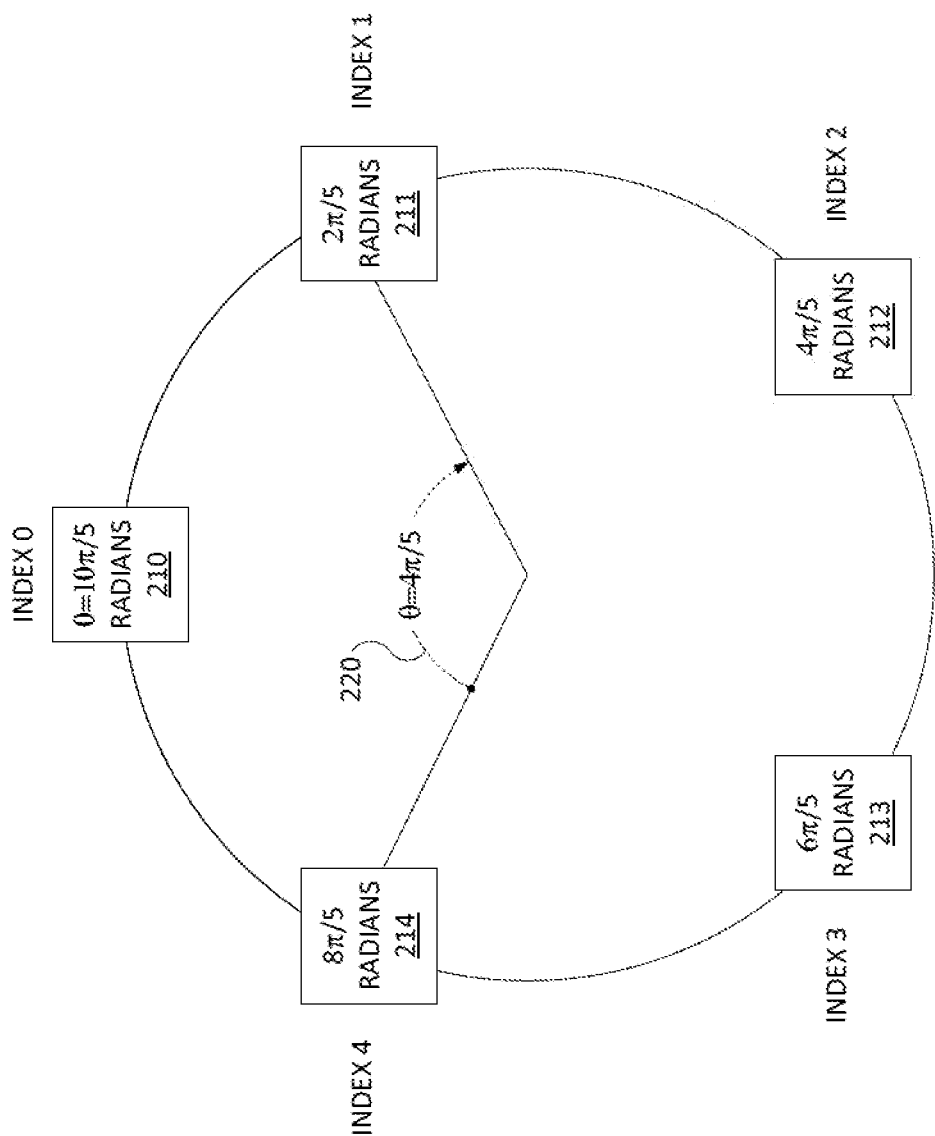
FIG. 2 illustrates an example M-ary cyclic symbol set within a cyclic symbol space.

FIG. 2 illustrates an example set of M-ary values within a cyclic symbol space 200, in accordance with the present disclosure. Symbol space 200 may be associated with a 5-ary (or quinary) cyclic symbol set, i.e., comprising the five symbols 210-215. As mentioned above, a cyclic symbol set is any discrete sequence of symbols that "wraps around" from the highest symbol to the lowest symbol. Another way of stating this property is that the symbols are associated with some ordering that allows one to iterate through a sequence of the symbols, starting at any particular symbol, in two different directions. Formally, an M-ary cyclic symbol set comprises a cyclically ordered set of M symbols, where the M symbols represent samples from a cyclic space, where indices associated with the M symbols in the cyclically ordered set increase monotonically and return to a starting value after reaching an M-th value. A feature of this cyclic property is that a distance (or "closeness") between two symbols can be measured in terms of forward and backward (e.g., clockwise and counterclockwise) progressions around the symbol space.

One example of cyclic symbols is a discrete set of angles. Angles are typically measured in degrees or radians. If 0 radians is set to correspond to the 12-o'clock position on the unit circle, a 5-ary cyclic symbol set can be given by the set of the following five angles: {0 radians, $2\pi/5$ radians, $4\pi/5$ radians, $6\pi/5$ radians, $8\pi/5$ radians}. As illustrated in FIG. 2, these angles are represented by symbols 210, 211, 212, 213, and 214, respectively, which map to sequential indices 0, 1, 2, 3, and 4, respectively. In this symbol space, the distance between $2\pi/5$ radians and $8\pi/5$ radians is only $4\pi/5$ radians, indicated by the angle 220, due to how the measurement of differences in angles wraps around the space; in a non-cyclic space, this distance would be $6\pi/5$ radians. In one example, a cyclic symbol set may be directly represented by these angles around a unit circle. However, in another example, cyclic symbols of various forms, i.e., other sets of angles, may be assigned to integer indices corresponding to points equi-spaced around a unit circle. Mathematically, distances between these symbols may then be represented by the angular distances between the positions of the symbols around the unit circle, as well as by index differences between sequential symbols. These distances may also be referred to herein as "value differences."

Cyclic symbols may be represented in a variety of ways when printed to a page or otherwise written to a surface from which the cyclic symbols can be read. FIG. 3 illustrates an example chart 300 that includes examples of cyclic symbols using color (row 310), size (row 320), physical position (row 330), angle (row 340), and glyphs (row 350). Cyclic symbols may also be represented by materials that are not detectable to the human eye, such non-visible wavelengths, quantum dots, and reflected polarization angles.

With respect to colors, in row 310 five colors are assigned to the respective sequential indices within a 5-ary cyclic symbol set, e.g., following the sequential indices 0-4 in FIG. 2. In one example, a cyclic space from which an M-ary cyclic symbol set is selected may comprise an HSL (hue-saturation-lightness) or HSV (hue-saturation-value) cylindrical coordinate space that is projected into a circle (e.g., to use hue only). In one example, the colors selected to comprise the M sequential values of an M-ary cyclic symbol set may be equally spaced around the HSL or HSV circle. However, in another example, the selected colors may be non-equally spaced.

In still another example, the colors assigned to different sequential positions in an M-ary cyclic symbol set may have no relation to HSL or HSV coordinates, and no relation to the wavelengths of light corresponding to the respective colors. In other words, the relation between the colors selected and their assigned positions within the ordering of an M-ary cyclic symbol set may be arbitrarily selected. For instance, in the example of FIG. 3, the colors in row 310 comprise white (W), cyan (C), magenta (M), yellow (Y) and black (B) corresponding to indices 0-4 respectively. It is clear that these colors do not correspond to an equally partitioned HSL or HSV cylindrical/circular space. However, this selection of colors is convenient for a 5-ary cyclic symbol set, since the values can be represented with each of the typical process inks used separately (cyan, magenta, yellow, and black), along with paper (or background) white.

Color has many useful properties and advantages in connection with the examples of the present disclosure. However, it is not the only feature that can be used to represent M-ary cyclic symbols. For instance, row 320 shows that the size of an icon (in this example, a square) can be used to represent cyclic values in a 5-ary cyclic symbol set. Row 330 shows that the position of an icon can also be used to represent cyclic values. For instance, within a given area for a symbol, the position of the icon may be shifted within the symbol area to represent the different symbols in the M-ary cyclic symbol set. Row 340 shows that angles can also be used to represent cyclic values. It should be noted that the five angles of the respective symbols shown in row 340 do not represent evenly space angles around 360 degrees. This example is intended to illustrate that there is no requirement that the sequence of symbols have any natural progression, or that the symbols themselves have any natural relation with one another. Thus, in one example, the angle or slope of the line for a particular symbol can correspond directly to the position of the symbol in a cyclical space from which the symbol is taken. In another example, the "angle" or position of the symbol in the cyclical space may have no direct relation to the angle or slope of the line as the symbol is printed on the page. There are, however, some advantages that results from selecting a natural progression, which will be discussed in the following.

Row 350 shows that glyphs, such as alphanumeric characters, may also be used to represent M-ary cyclic values. Although the symbols in row 350 are the first five letters of the English alphabet, there is no requirement that letters assigned to indices in a sequence of M symbols in an M-ary cyclic symbol set follow any particular order. An example where alphanumeric glyphs are used in a 5-ary cyclic symbol set is provided in connection with FIG. 4.

Instead of defining an M-ary cyclic symbol set as M specific values in a cyclic space, an M-ary cyclic symbol set can also be defined as a set of M value differences, e.g., angular shifts or sequential index differences in the space. Put another way, the set of differences between values in one cyclic space may define another cyclic space. For instance, a cyclic space may comprise a set of five possible symbol values. In addition, the five symbol values may be associated with indices corresponding to equally spaced points around a unit circle. The cyclic space 200 of FIG. 2 is representative of such a symbol space. In this case, a 5-ary cyclic symbol set may then be defined as angular shifts, or angular value differences of: $-4\pi/5$ radians, $-2\pi/5$ radians, 0 radians, $+2\pi/5$ radians, and $+4\pi/5$ radians, respectively. It should be noted that if differences in one cyclic space are to be defined as another, it is convenient to adopt a set of symbols that is based on a natural ordering of differences in values in the original space. Otherwise, calculating the difference between arbitrarily selected values in either space is not as straightforward. When utilizing a cyclic space comprising a set of discrete symbol values, it is possible to describe the use integer index shifts, or value differences to circularly code a set of information rather than referring to angular shifts. For instance, instead of referring to shifts of $-4\pi/5$ radians, $-2\pi/5$ radians, 0 radians, $+2\pi/5$ radians, and $+4\pi/5$, a 5-ary cyclic symbol set may comprise cyclic index differences of $-2$, $-1$, 0, $+1$, and $+2$ within the cyclic set defined by the five symbol values. In other words, the M-ary cyclic symbol set may comprise value differences that are integer multiples of a difference between two adjacent symbol values within the original cyclic space from which the M-ary cyclic symbol set is derived.

Regardless of whether the value differences are represented by angular shifts or cyclic index differences, a similar process may be followed when encoding a message to a surface using an M-ary cyclic symbol set that is based upon value differences in a cyclic space. For instance, a first symbol may be selected and written to the surface. In one example, the first symbol may be arbitrarily selected. Thereafter, each successive symbol in the string comprises a value represented by an angular shift or index difference as compared to the angle or index corresponding to the preceding symbol.

Figure 4:
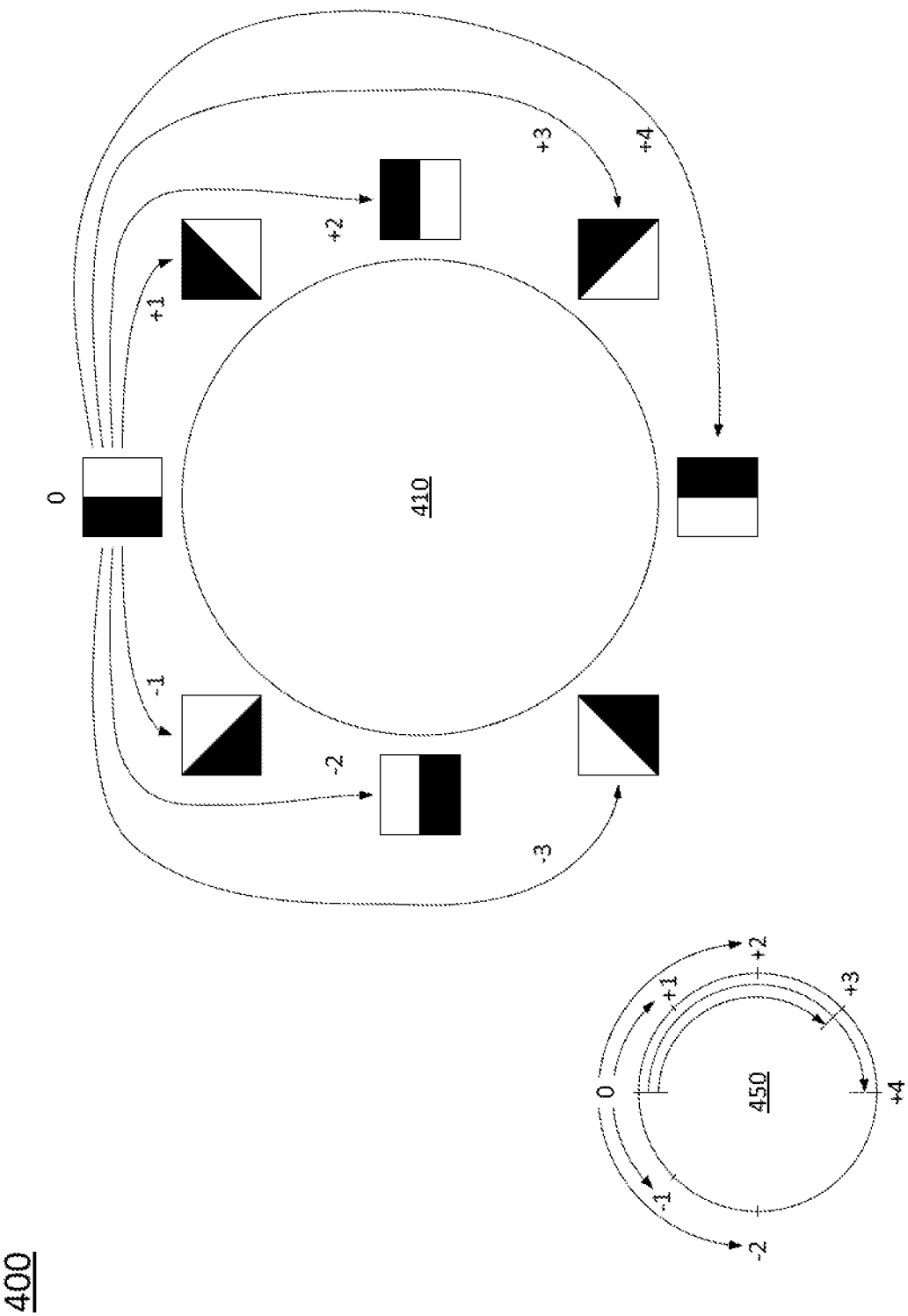
FIG. 4 illustrates an example M-ary cyclic symbol set derived from another example M-ary cyclic symbol set.

In continuing with these examples, FIG. 4 illustrates an 8-ary cyclic symbol set 400 comprising eight symbols represented by the angle or slope of a border between black and white regions of each symbol. In this example, the slope of the border of each symbol corresponds to the angular position around the unit circle 410. These eight symbols may be used as an 8-ary cyclic symbol set to directly encode a base-8 set of information. However, another M-ary cyclic symbol set may be based upon index differences within the 8-ary cyclic symbol set 400. For example, as indicated in FIG. 4, up to seven different index shifts, and an index shift of zero, are available when using the eight symbols of the 8-ary cyclic symbol set 400. However, an M-ary cyclic symbol set where M is less than 8 may also be devised based upon index differences within the 8-ary cyclic symbol set 400. For instance, a 6-ary cyclic symbol set 450 may have six symbols, where the six symbols correspond to the index shifts of $\{-2,-1,+1,+2,+3,+4\}$ within the 8-ary cyclic symbol set 400.

In accordance with the present disclosure, some examples may also use non-integer partitions of a cyclic space. However, when non-integer partitions of a cyclic space are utilized, it is necessary to formalize some definitions for the intermediate symbols. For instance, a cyclic symbol space may be defined where there is some "continuous" definition of values that exist in the entire space (such as a set of angles, or a set of colors within an HSL or HSV space, for example). A set of cyclic symbols may then be defined as a set of signed distances within the cyclic space, where there are no fixed symbol values. For instance, a 5-ary cyclic symbol set may comprise shifts within a continuous cyclic symbol space of 360 degrees (or $2\pi$ radians), where the five symbols comprise (angular) shifts in the continuous cyclic space of: 4 radians, $-2$ radians, 0 radians, $+2$ radians, and $+4$ radians respectively. In other words, the M-ary cyclic symbol set may comprise value differences that are non-integer multiples of a value difference between two adjacent symbol values from an equi-spaced set of values from within the original cyclic space from which the M-ary cyclic symbol set is derived.

Figure 5:
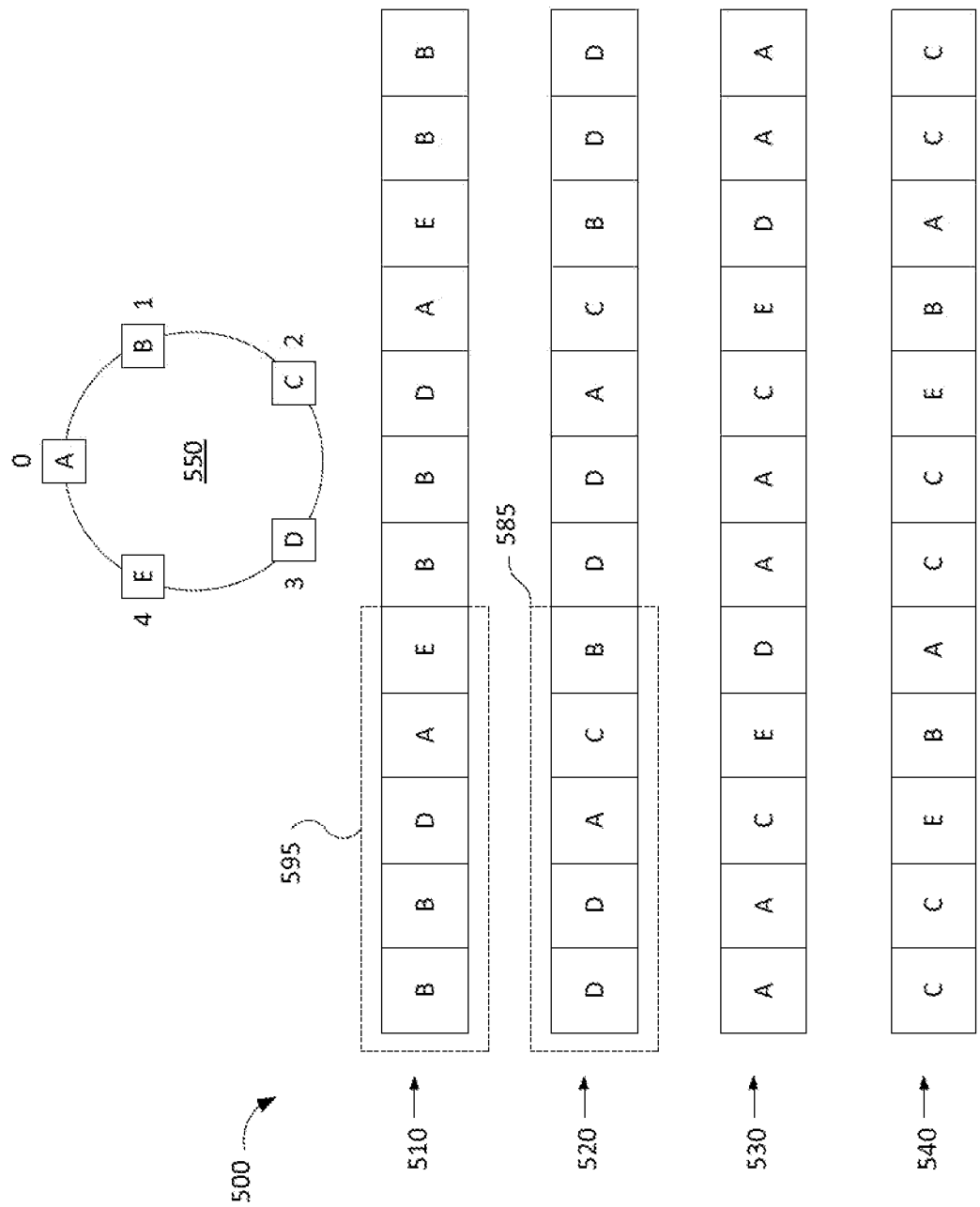
FIG. 5 illustrates an example portion of an array written to a surface.

FIG. 5 illustrates a portion of an example array 500 that is written to a surface. A 5-ary cyclic symbol set 550 is also illustrated, comprising the alphanumeric glyphs A, B, C, D and E assigned to positions 0-4 respectively. The 5-ary cyclic symbol set 550 is intended to be used as a key in connection with the patterns written to the array 500.

It should be noted that array 500 may extend in two dimensions where the pattern shown in the portion illustrated in FIG. 5 is simply a subset of the full array 500. The portion of the array 500 comprises rows 510, 520, 530 and 540 respectively. A string 595 is written in the first row (row 510), comprising the symbols {B,B,D,A,E}. In one example, string 595 may comprise a binary message that has been translated into a base-5 numeric string and further translated into a string using symbols selected from the 5-ary cyclic symbol set 550. In another example, string 595 may comprise a version of an original string that has been manipulated in some way, such as a cyclical value shift of symbols in the string, or a circular phase shift of symbols in the string. The string 595 is repeated across row 510 until the end of the row. It is only possible to write two complete versions of string 595 to each row. Thus, only a portion of string 595 appears at the end of row 510, i.e., the first two symbols {B,B}.

In one example, cyclical shifts of a pattern may be written to a surface for successively repeated versions of the pattern. For instance, each row may comprise a cyclically shifted version of the pattern as compared to a row above, where the cyclical shift comprises a shift of one or more indices in the 5-ary cyclic symbol set 550. In the example of FIG. 5, a cyclical shift of the string 595 is implemented, comprising a shift of two symbol indices in the 5-ary cyclic symbol set 550. Thus, string 585 comprises the set of symbols {D,D,A,C,B}, where each symbol is a forward/clockwise shift from a corresponding symbol in the original string 595. The string 585 is repeated across row 520. Row 530 comprises the same pattern of row 520, with another cyclical shift comprising a forward shift of two symbol indices in the 5-ary cyclic symbol set 550. Similarly, row 550 comprises the same pattern of row 530, with another forward shift of two symbol indices.

In one example, the value of inter-row cyclical value shifts may be used to indicate the symbol index (in the 5-ary cyclic symbol set 550) of one of the symbols in an original string. For example, string 595 may comprise a cyclically shifted copy of an original string. In another example, the inter-row cyclical value shifts may be used to denote a phase of the original string with respect to the cyclic standard form of the string, i.e., the lowest values of the string achieved by repeated cyclic values shifts. Similarly, string 585 is a cyclically shifted version of string 595. Thus, it may be unknown which of a multitude of cyclically shifted versions of a string comprises the original string. Thus, to recover the original string, the concept of standard form may also be applied to cyclic symbol patterns repeated in an array such as the array 500.

To illustrate one of these recovery examples, the original 5-ary string may comprise {C,C,E,B,A}. Given a sufficient capture window, and using statistical methods, e.g., a blind estimation technique, it can be determined that successive cyclically shifted versions of a 5-ary string are repeated row to row. Thus, for example, it may be determinable that the original 5-ary string comprises one of: {B,B,D,A,E}, {D,D,A,C,B}, {A,A,C,E,D}, {C,C,E,B,A} or {E,E,B,D,C}. In addition, a blind estimation technique, or similar process may also determine that the inter-row cyclical shift comprises a forward (clockwise) shift of two symbol indices. In one example, the inter-row cyclical shift may be used to encode the symbol index (in the 5-ary cyclic symbol set 550) of the first symbol of the original string. Thus, since the inter-row cyclical shift is two (2), this corresponds to index 2 within the 5-ary cyclic space (having indices 0-4). Since the symbol "C" is assigned to index 2, the first symbol in the original 5-ary string is C. Thus, the original 5-ary string is {C,C,E,B,A}.

In the foregoing example, inter-row cyclic shifts may be utilized to convey supplemental information to allow the original version of the 5-ary string to be recovered. However, this information may also be conveyed in another manner, e.g., printing the original form of the string in a different color as compared to other repeated versions of the string, or in some other manner. In this case, inter-row cyclical value shifts may be used to convey some other type of information, such as the version number of a document. For instance, an inter-row cyclical value shift of two (2) may indicate that the surface represents the second revision of the document, an inter-row cyclical value shift of three (3) may indicate that it represents the third revision of the document, and so on. Inter-row, or row-to-row cyclical value shifts may also be varied in order to encode a larger set of information. For instance, the array 500 may be modified to have a cyclical value shift of one symbol index between the pattern in row 510 and the pattern in row 520, a cyclical shift of three symbol indices between row 520 and 530, and so forth. In moving from row to row, each of the successive cyclical shifts may encode a set of information that is different from the original 5-ary string.

It should be noted that a row-to-row cyclical value shift is just one example of the types of perturbations, or modifications in a pattern that may be utilized when writing a string of M-ary cyclic symbols to a surface. For instance, the assignment of perturbations to rows versus columns (or both), and the orientation of the pattern may be varied.

Encoding using M-ary cyclic symbols may also comprise repeating patterns in two-dimensions on a surface. For example, M-ary cyclic symbols may also be used in conjunction with circular coding schemes to encode additional information via perturbations in two-dimensions, where the perturbations may comprise cyclical shifts in an M-ary cyclic symbol set, and circular shifts of a pattern derived from an M-ary string representing an original message. In other words, systematically modified versions of a string or pattern may be written to a surface where the systematic modifications comprise cyclical value shifts of one or more indices within an M-ary cyclic symbol set, or circular shifts by one or more symbol positions within a string and/or within a pattern derived from the string. In another implementation, the modifications may comprise cyclic value shifts with arbitrarily selected values, or 2D circular rearrangements of the symbols, including fractional circular shifts in two dimensions, where only a portion of a digit is circularly wrapped around to the opposite end of the message. In still another implementation, the set of modifications can be extended to include arbitrary geometric periodic perturbations of the pattern, which may be modeled as arbitrary geometric perturbations of the window outlining a two-dimensional periodically-extended version of the pattern.

Figure 6:
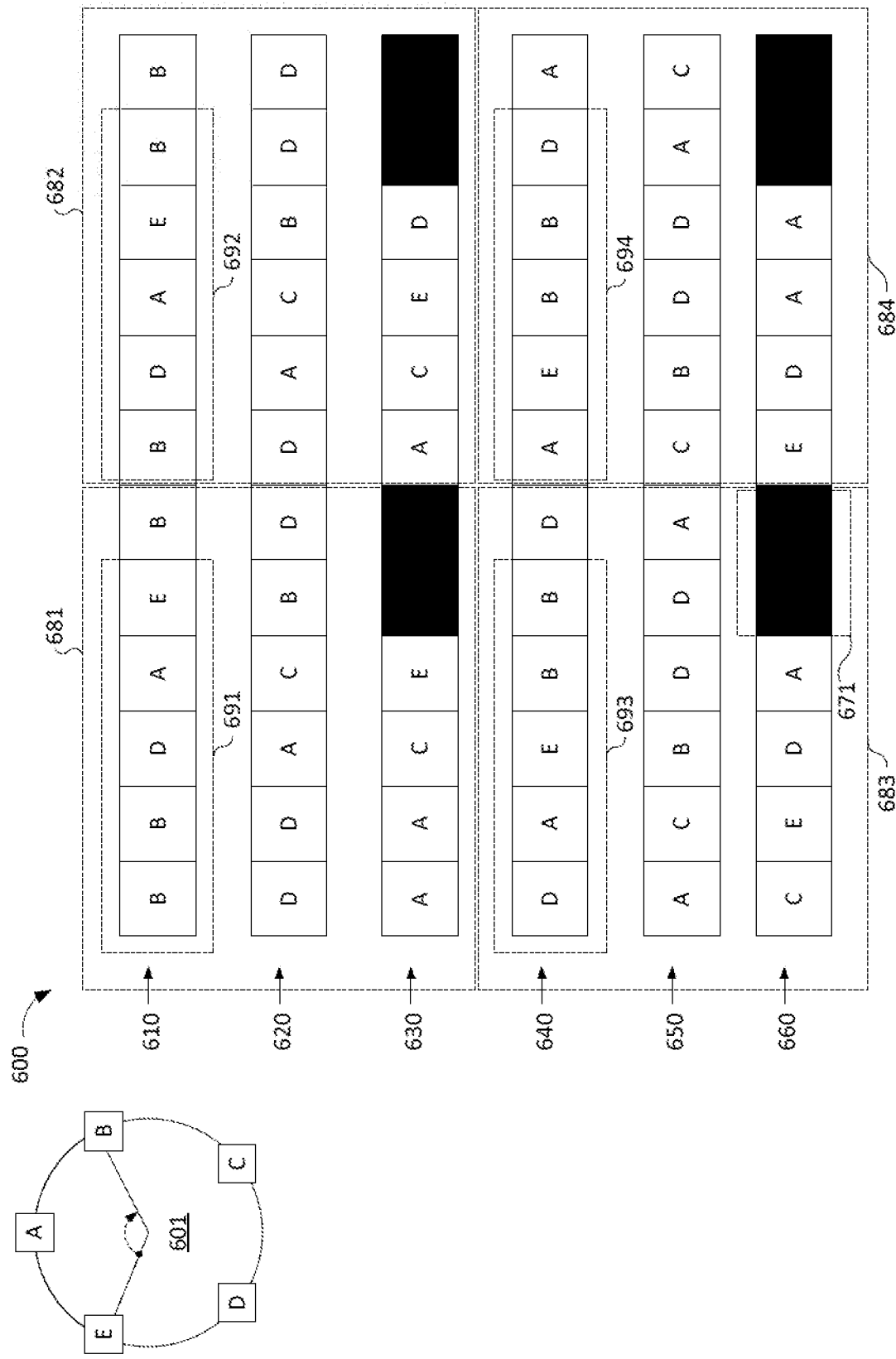
FIG. 6 illustrates an example portion of an additional array written to a surface.

To illustrate, FIG. 6 depicts an example portion of a surface 600 where there are four 6×3 tiles, 681, 682, 683, and 684. It is possible to delineate the boundaries of each tile using blind estimation techniques, or other algorithms. However, for ease of illustration, out-of-band markers, e.g., two black squares, are provided to indicate the end of each tile. One of the out-of-band markers is indicated by the reference numeral 671 in the figure. A key for the M-ary cyclic coding scheme of this example is indicated by the 5-ary cyclic symbol set 601. In particular, a 5-ary cyclic symbol set comprises the symbols {A,B,C,D,E}, and is to be used in connection with FIG. 6.

In the present example, inter-row cyclical value shifts of two cyclic indices are used within each tile. For instance, string 691 is repeated within row 610 up to the end of the tile 681. Within tile 681, row 620 comprises a pattern that is cyclically shifted by two cyclic symbol indices with respect to row 610. Similarly, row 620 comprises a pattern that is cyclically shifted by two cyclic symbol indices with respect to row 620. However, a full pattern cannot be written to row 630 in tile 681 due to the presence of the out-of-band marker indicating the end of the tile. Moving from tile 681 in the upper left to tile 682 in the upper right, the pattern begins with a circularly shifted version of string 691. For instance, string 692 comprises a circularly shifted version of string 691, where the symbols are circularly shifted by one symbol position, or digit, in the string. The string 692 is repeated to the end of the row 610 (up to the number of symbols possible). In this case, it is only possible to write a complete string 692 once in row 610. A single symbol is written to the last space in row 610. Moving to row 620, a pattern comprising a cyclically shifted version of row 610 is written (using a cyclical shift of two cyclic symbol indices in the 5-ary cyclic symbol set 601). A similar cyclical shift is implemented moving from row 620 to row 630 within tile 682.

In tile 683 on the bottom left, a string 693 is written to the first row, row 640, comprising the string 695 circularly shifted by two digits. The string 693 is repeated across the row 640 to the end of tile 683, i.e., 6 spaces. Row 650 in tile 683 comprises the pattern of row 640 cyclically shifted by two symbol indices. Row 660 in tile 683 comprises the pattern of row 650 cyclically shifted by two symbol indices. However, the last two spaces are occupied by the out-of-band markers indicating the end of the tile. Although out-of-band markers comprise two black squares, in another example the markers may comprise colors or other markers that are rendered covertly, such as by using colors that are elucidated by infrared light irradiation and anti-Stokes up-conversion.

The last tile 684 on the bottom right begins with string 694, which comprises the symbols of string 693 circularly shifted by a single digit. String 694 also comprises string 692 of tile 682, circularly shifted by two digits. The string 694 is repeated across row 640 to the end of tile 684. Inter-row cyclical value shifts between rows 640 and 650, and between rows 650 and 660 comprise cyclical shifts of two symbol indices in the 5-ary cyclic symbol set 601.

FIG. 6 illustrates just one example of how a set of information, or message, may be encoded on a surface using M-ary cyclic symbols in conjunction with circular coding, where perturbations in a pattern in two dimensions may be used to convey various types of additional information. Perturbations to a pattern may be "nested," where for example, a pattern comprises certain modifications to a string within a tile, and where different modifications to the pattern are applied inter-tile. In this example, cyclical shifts are utilized row-to-row within each tile. Moving horizontally from one tile to the next, a circular shift of one digit is implemented. Moving vertically from one tile to the next, a different circular shift is implemented, i.e., two symbol positions, or digits. Thus, while an original message may be represented by a string of M-ary cyclic symbols that is repeated in a pattern on a surface, the value of the cyclical shift, and the values of the circular shifts in the horizontal and vertical directions may be used to convey any type of additional information desired. The additional information may provide a key to recover the original string of M-ary cyclic symbols from a standard form of the string, or may comprise any other type of information, such as an authentication and security code, an error correction code, a version number of a document, and so forth.

As mentioned above, an M-ary cyclic symbol set may comprise value differences in another cyclic space. In one example, the value differences comprise integer multiples of a difference between two adjacent symbol values within the original cyclic space from which the M-ary cyclic symbol set is derived. In another example, the value differences comprise non-integer multiples of a difference between two adjacent symbol values within the original cyclic space from which the M-ary cyclic symbol set is derived. Accordingly, if a cyclic shift is used to modify a pattern when moving from one tile to the next, the cyclic shift may comprise a cyclic shift that is an integer or a non-integer multiple of a difference between two adjacent symbol values from an equi-spaced set within the original cyclic space from which the M-ary cyclic symbol set is derived, depending upon the needs of the application.

Additional encoding schemes that may be used as an alternative to, or in conjunction with the above described techniques may include one or more of the following examples. In one example, where the M-ary cyclic symbols set comprises non-color symbols, different colors may be used to represent each row, or each tile or other unit within an array, may be partitioned such that groups of rows (or tiles) of a certain color are associated with a particular semantic meaning, such as phase offset information versus non-phase related information. In this manner, the combination of spatial and color-spectral separation can increase the performance of a reference free decoding scheme, e.g., without out-of-band phase offset indications, or the like. In another example, quasi-random cyclic shifts may be applied on successive rows to control or intentionally introduce visual artifacts associated with a given encoded pattern. In other words, the cyclic shifts do not necessarily encode information, but may have some aesthetic purpose. In still another example, perturbations applied intra-tile or inter-tile may be partitioned into groups such that placement of certain sets of perturbations with respect to other sets of perturbations convey information.

In one example, the present disclosure may comprise a system that does not utilize a fixed number of cyclic symbols. In other words, the number M of symbols in the M-ary cyclic symbol set may be varied. For example, messages to be encoded may comprise variable length strings in the native format. These strings may be translated into base-M and further into a string of M-ary cyclic symbols. These strings may also have varying lengths. However, strings of a certain length may not fit particularly well within a tile or other regular unit in which the string may be repeated in a pattern on the surface. For instance, a six digit string does not fit well into an eight digit row, since it will only be repeated in full one time, and only two digits are repeated. Thus, in one example, the present disclosure selects a number M and generates a string of symbols from an M-ary cyclic symbol set, where the number of digits in the resulting string is such that the length of a row, or the number of digits within some other regular unit, is an integer multiple of the length of the string. This approach has the added benefit of reducing the number of computations required when using a blind estimation technique to recover an original message from an encoded surface. For example, if there is an M-ary set of data bearing symbols and an N-ary set of non-data bearing symbols, the former may be well known and decoded to find information, and the latter may be used to provide overall aesthetics when mixed properly within the M-ary elements.

As such, examples of the present disclosure allow a number of different encoding schemes to be implemented where a set of information, or message translated to an M-ary cyclic symbol set can be written in a repeating pattern on a surface and read by an image capture device. Where a sufficiently large portion of the surface is captured by the image capture device, the original message can be recovered. However, common to all of these schemes is that perturbations, e.g., shifts or modifications to the pattern in one or more dimensions, may be implemented to aid in recovery of the original message, or to convey additional or supplemental information for a variety of purposes. In addition, the perturbations may utilize one or both of cyclical shifts in an M-ary cyclic symbol set and circular shifts of a number of digits within a string.

Figure 7:
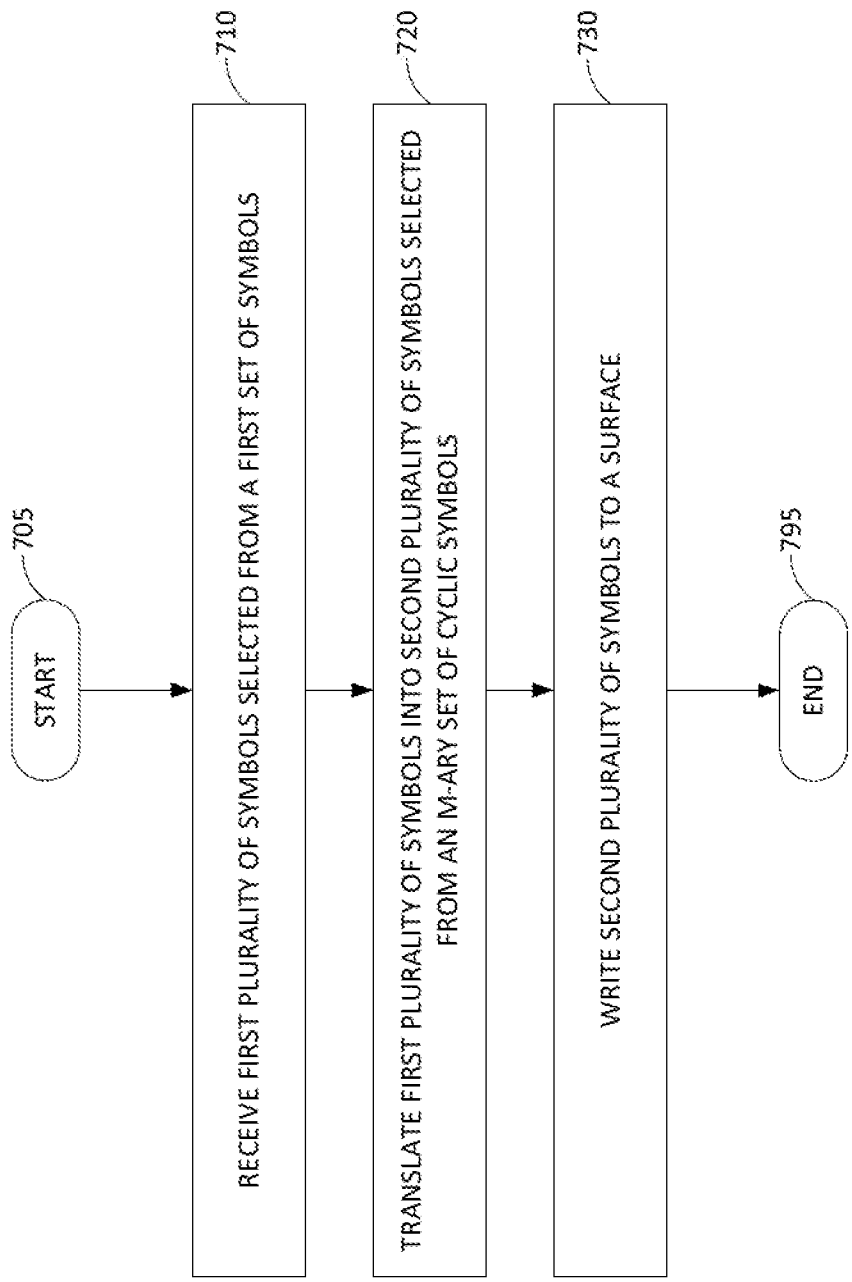
FIG. 7 illustrates a flowchart of an example method for writing a plurality of M-ary cyclic symbols to a surface.
Figure 9:
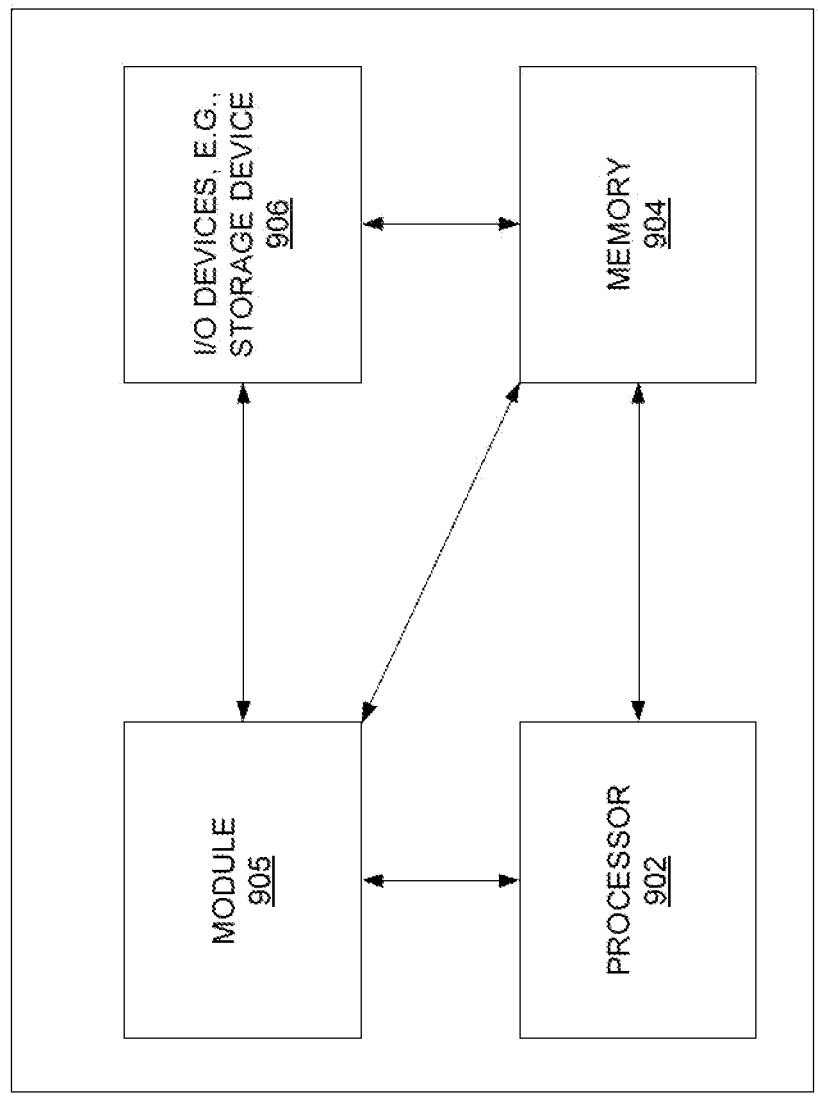
FIG. 9 is an example high-level block diagram of a computing device for use in performing the functions described herein.

FIG. 7 illustrates a flowchart of an example method 700 for writing a plurality of M-ary cyclic symbols to a surface. In one example, the steps, operations, or functions (e.g., the "blocks") of the method 700 may be implemented by a computing device having a processor, a memory and input/output devices as illustrated in FIG. 9 and discussed below, specifically programmed to perform the steps, functions and/or operations of the method. For illustrative purposes, the method 700 will now be described in terms of an example where blocks of the method are performed by a processor, such as processor 902 in FIG. 9. It should be noted that when blocks of the method 700 are performed by a processor, the processor may perform the operations directly or may send instructions to cause one or more other devices to perform the functions, such as by sending instructions to a printer or other device to write symbols to a surface, and so forth.

At block 705 the method 700 begins. At block 710, the processor receives a first plurality of symbols selected from a first set of symbols. For example, the first plurality of symbols may comprise a binary sequence representing a message or a set of information, such as a script, snippet of code, instructions, or any type of structured data. In another example, the first plurality of symbols may comprise a base-M string representing a set of information.

At block 720, the processor translates the first plurality of symbols into a second plurality of symbols selected from an M-ary cyclic symbol set. For instance, if the first plurality of symbols comprises a binary string representing a message, the binary string may be translated into a base-M string representing the message. The base-M string may then be further translated into a string comprising symbols selected from an M-ary cyclic symbol set. In another example, the first plurality of symbols may already comprise a base-M string. Thus, block 720 may comprise the processor translating the base-M string into a set of M-ary cyclic symbols, without the prior operations to translate into a base-M string. In one example, the translating may involve consulting a table to determine the appropriate M-ary cyclic symbols to represent the base-M string. For example, one of the rows of the chart 300 of FIG. 3 may be utilized to determine the M-ary symbol corresponding to the base-M value of each digit within the base-M string. In various examples, the M-ary cyclic symbol set may thus comprise symbols represented by: colors, sizes of an icon, positions of an icon, slopes or angles of a line, alphanumeric glyphs, and so on.

In one example, the M-ary cyclic symbols may comprise value differences in another cyclic space. For instance, the M-ary cyclic symbols may be selected from the 6-ary cyclic symbol set 450 in FIG. 4, where the 6-ary cyclic symbol set 450 represent index shifts or angular shifts, broadly "value differences," in the 8-ary cyclic symbol set 400. In one example, the M-ary cyclic symbols may comprise value shifts that correspond to rational fractions of the size of the cyclic space. For instance, a 5-ary cyclic symbol set may comprise angular shifts of $-4\pi/5$ radians, $-2\pi/5$ radians, 0 radians, $+2\pi/5$ radians, and $+4\pi/5$ within a cyclic space, yielding five equally spaced symbols. The same set of cyclic symbols may also be represented by index shifts, of $-2$, $-1$, $0$, $+1$ and $+2$ within the cyclic space defined by the same five equally-spaced symbol values. In another example, the M-ary cyclic symbols may comprise value shifts that do not correspond to rational fractions of the size of the cyclic space. For example, a 5-ary cyclic symbol set may comprise angular shifts within a continuous cyclic space, where the cyclic space is $2\pi$ radians, and the angular shifts are: 4 radians, $-2$ radians, 0 radians, $+2$ radians, and $+4$ radians respectively.

In each example where the M-ary cyclic symbols comprise value shifts in another cyclic space, block 720 may involve the processor performing a digit-by-digit correlation of the value differences of the M-ary cyclic symbol set with corresponding symbols within the other cyclic space. In this way, value differences between symbols selected for each successive digit may encode the base-M string in the M-ary cyclic symbol set. In various examples, the M-ary cyclic symbol set may thus comprise: color differences, differences in size of an icon, differences in position of an icon, differences in a slope or angle of a line, and so forth.

In one example, block 720 further comprises the processor translating the second plurality of symbols into a circularly coded standard form. For instance, the second plurality of symbols may be arranged in a string, where digits of the string are circularly shifted to determine a lowest value circularly-shifted form. The number of digits that are shifted to obtain the standard form comprises the phase of the original string. In one example, the circularly coded standard form is utilized in connection with a pattern written to the surface at block 730.

At block 730, the processor writes the second plurality of symbols to a surface. For instance, block 730 may comprise printing the second plurality of symbols to a surface, such as a sheet of paper, using an inkjet printer or other type of ink-based printing device, lithographically printing the second plurality of symbols to a surface, optically writing the symbols to a surface, such as using a laser diode of a readable/writeable compact disk drive (CD-RW), and so forth. Thus, at block 730 the processor may send instructions to one or more other devices, or to one or more other components of a computing device in which the processor resides, in order to complete the physical writing of the plurality of symbols to the surface.

In one example, the writing comprises forming a two-dimensional array of tiles on the surface. In one example, each tile may comprise a two-dimensional pattern of symbols, where the second plurality of symbols is written in an arrangement that forms the two-dimensional pattern of symbols in each tile. For example, each tile may comprise a pattern such as one of the patterns illustrated for each of the respective tiles 681, 682, 683, and 684 in FIG. 6. In one example, the two-dimensional pattern of symbols within each tile may comprise cyclical shifts of the second plurality of symbols from row to row, from column to column, between non-adjacent rows or columns, distributed non-uniformly and non-separably over all tiles, and so forth.

In one example, for at least one tile, the two-dimensional pattern of symbols comprises a modified version of the two-dimensional pattern of symbols in another tile, e.g., an inter-tile modification to the pattern. For instance, a first tile, such as tile 681 in FIG. 6 may comprise a first two-dimensional pattern of symbols based upon the second plurality of symbols. A second tile, such as tile 682, may then comprise a second two-dimensional pattern of symbols comprising a circularly shifted version of the pattern in tile 681 (e.g., using a circular shift of two digits). Different modifications to a pattern may be applied tile-to-tile in vertical and horizontal directions. In one example, the modifications may comprise cyclical shifts in the pattern, circular shifts in the pattern, or a combination of cyclic and circular shifts.

In one example, a systematic modification is applied to the two-dimensional pattern of symbols moving from tile-to-tile; where modifications are selected according to some pre-defined rule, resulting in a regular set of modifications. In another example, the modifications do not have to be applied according to a pre-defined pattern. In this case, the type of inter-tile modification, and the value of the modification can be used to encode some type of information. For example, the inter-tile modification may encode supplemental information that may be used to help extract the second plurality of symbols when the surface is read by an image capture device. The inter-tile modification may also encode other types of information, such as security and authentication information, an error correction code, version information, and so forth. Since different inter-tile modifications may be applied moving in two different dimensions of the surface, the different inter-tile modifications may encode different types of information.

Since the inter-tile modifications to the pattern may comprise cyclical shifts, the modifications may take the form of a cyclic value shift in values of the second plurality of symbols in the pattern. In addition, since the M-ary cyclic symbol set may comprise value differences in another cyclic space, cyclic shifts may comprise an integer multiple of a difference between two values in the M-ary cyclic symbol set. Alternatively, cyclic shifts may comprise an angular shift by a non-integer multiple of a difference between two values in the M-ary cyclic symbol set.

It should be noted that the example of FIG. 7 is provided for illustrative purposes only and that various modifications of the method 700 may be devised in accordance with the present disclosure. For example, in writing of the second plurality of symbols to the surface at block 730, the present disclosure is not limited to the use of any one particular type of inter-tile modification to the pattern. Following block 730, the method 700 proceeds to block 795 where the method ends.

Figure 8:
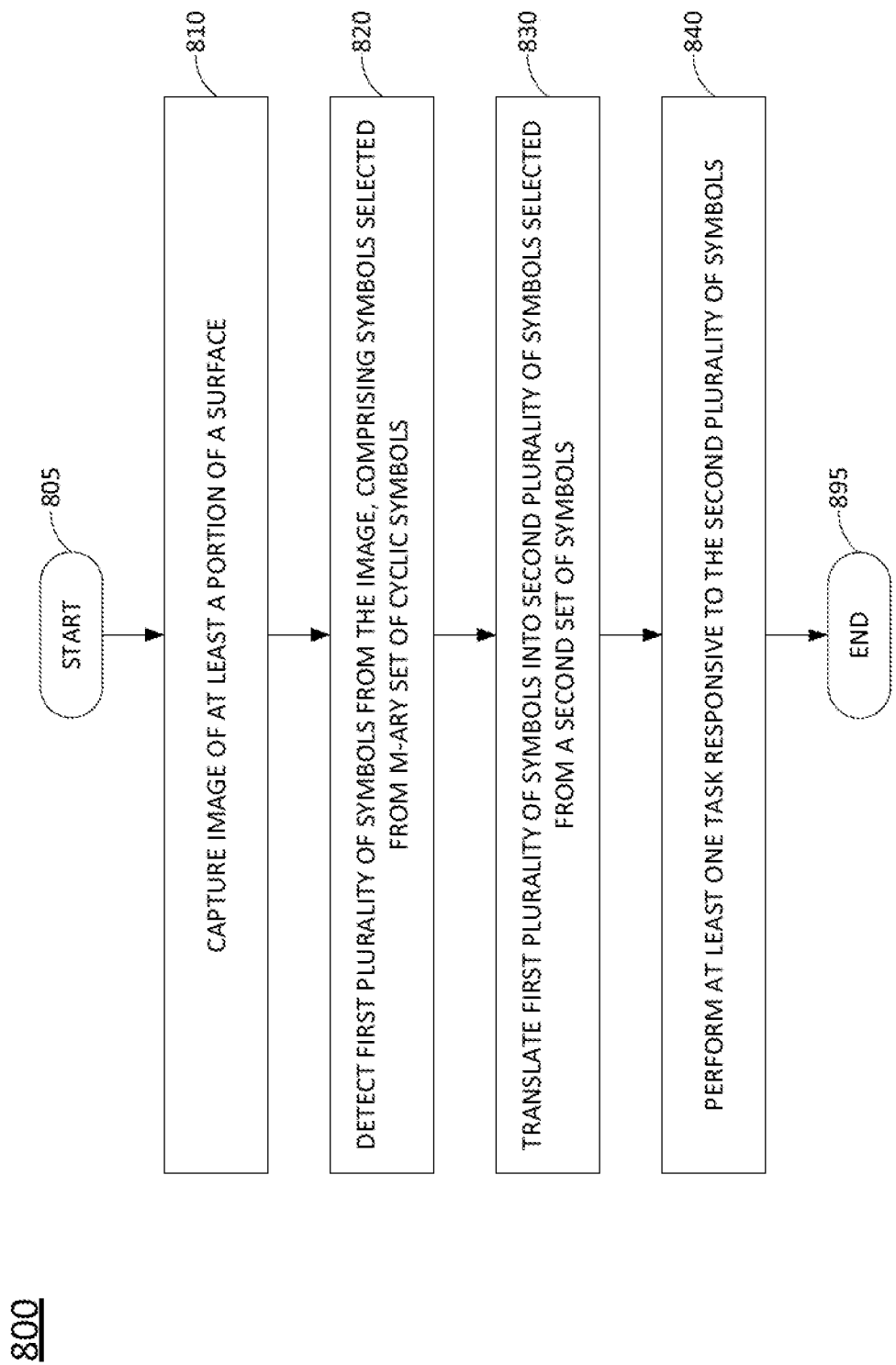
FIG. 8 illustrates a flowchart of an example method for capturing a plurality of M-ary cyclic symbols from a surface.

FIG. 8 illustrates a flowchart of an example method 800 for capturing a plurality of M-ary cyclic symbols from a surface. In one example, the steps, operations, or functions (e.g., the "blocks") of the method 800 may be implemented by a computing device having a processor, a memory and input/output devices as illustrated in FIG. 9 and discussed below, specifically programmed to perform the steps, functions and/or operations of the method. For illustrative purposes, the method 800 will now be described in terms of an example where blocks of the method are performed by a processor, such as processor 902 in FIG. 9. It should be noted that when blocks of the method 800 are performed by a processor, the processor may perform the operations directly or may send instructions to cause one or more other devices to perform the function, such as by sending instructions to a digital camera or other image capture device to capture an image of a surface, and so forth.

At block 805 the method 800 begins. At block 810, the processor captures an image of at least a portion of a surface. In one example, the image of the at least a portion of the surface includes at least a portion of a two-dimensional array of tiles on the surface. In one example, each tile may comprise a two-dimensional pattern of symbols, where a first plurality of symbols is written in an arrangement that forms the two-dimensional pattern of symbols in each tile. For example, each tile may comprise a pattern such as one of the patterns illustrated for each of the respective tiles 681, 682, 683, and 684 in FIG. 6. In one example, the first plurality of symbols comprises a string of symbols selected from an M-ary cyclic symbol set. In one example, block 810 may comprise the processor sending instructions to another component, such as a digital camera or other image capture device, in order to capture the image of at least a portion of the surface. As such, block 810 may further comprise receiving a copy of the image back from the other component.

In one example, the two-dimensional pattern of symbols comprises at least one systematic modification moving from tile-to-tile; modifications are selected according to some pre-defined rule, resulting in a regular set of modifications. In another example, the modifications do not have to be applied according to a pre-defined pattern. In other words, the type of inter-tile modification, and the value of the modification can be used to encode some type of information. For example, the inter-tile modification may encode supplemental information that may be used to help extract a second plurality of symbols at block 830. The inter-tile modification may also encode other types of information, such as security and authentication information, an error correction code, version information, and so forth. The processor may apply different inter-tile modifications in two different dimensions of the surface, where the different inter-tile modifications may encode different types of information.

At block 820, the processor detects the first plurality of symbols from the image. As mentioned above, the first plurality of symbols may comprise symbols selected from an M-ary cyclic symbol set. In addition, the image may include a number of tiles, where there is at least one inter-tile variation or modification to a two-dimensional pattern of symbols within each tile. In one example, the modifications may comprise cyclical shifts in the pattern, circular shifts in the pattern, or a combination of cyclic and circular shifts. Since the inter-tile modifications to the pattern may comprise cyclical shifts, the modifications may take the form of a cyclical shift in values of the first plurality of symbols in the pattern. In addition, since the M-ary cyclic symbol set may comprise value differences in another cyclic space, cyclical shifts may comprise an integer multiple of a difference between two values in the M-ary cyclic symbol set. Alternatively, cyclical shifts may comprise an angular shift by a non-integer multiple of a difference between two values in the M-ary cyclic symbol set.

In any case, since the image may include a plurality of tiles from a two-dimensional array, and since each tile may have modified versions of a pattern that is based upon the first plurality of symbols, it may not be apparent which tiles, and which portions of the patterns within each tile may comprise an original string. In one example, special markers, such as black dots, icons or images that are not part of the M-ary cyclic symbol set, a different color (where color is not the defining feature of the M-ary cyclic symbol set), and the like may be utilized to delineate where the original string may be repeated. However, in another example, the first plurality of symbols may comprise a set of symbols that is a circularly shifted standard form of an original M-ary string. Thus, the patterns within the tiles of the image may be based upon the standard form of the original M-ary string. While it is possible that the original string is repeated somewhere within at least one of the tiles within the image, its location may not be apparent without being indicated by special markers.

However, in one example, the processor may perform a blind estimation technique to determine the standard form of the string if a sufficiently large number of repetitions of the pattern are captured in the image. For instance, if it is known that the inter-tile modification to the pattern moving from left to right is some type of cyclical shift in the pattern, there are a finite number of possible cyclical shifts that may be tested. For instance, in a 5-ary cyclic symbol set, there are five possible cyclical shifts from one pattern to the next. Thus, the pattern in the first tile may be taken as an initial parameter. The pattern may then be cyclically shifted by 0 values, or symbol indices within the sequence of the 5-ary cyclic symbol set. Next, the pattern may be cyclically shifted by one value, or one symbol index within the sequence of the 5-ary cyclic symbol set, and so on. Each cyclically shifted version of the original pattern may then be compared to the pattern in the second tile. Where there is a match, is the processor may then determine that this cyclical shift is the modification to the pattern in moving from the first tile to the second tile.

The processor may use a similar technique to estimate an inter-tile circular shift where the modification to the pattern comprises some form of circular shift. For instance, if it is known in advance that the length of a string comprising the first plurality of symbols is a particular number of digits, "D," at most up to D−1 circular shifts may be tested to determine the inter-tile circular shift. The process may be expanded to evaluate additional tile-to-tile modifications, e.g., moving along a row of tiles in a left to right direction across a surface. Thus, for instance, it may be determined that successive tiles include circularly shifted and/or cyclically shifted versions of a same pattern. It should be noted that tiles may also include intra-tile modifications to a pattern. For instance, there may be row-to-row or column-to-column circular shifts or cyclical shifts in a pattern within a single tile. Thus, a similar blind estimation process may be utilized to determine patterns within a tile.

In addition, the processor may also perform a blind estimation technique to determine the boundaries from one tile to the next in the absence of special markers to delineate such boundaries. For instance, if it is known that an array includes tiles of a particular size, e.g., 6×3 tiles, the blind estimation technique may take successive candidate windows of 6×3 symbol locations. Patterns in the 6×3 windows adjacent to the candidate window may then be compared to the pattern in the candidate window to determine if the patterns have some defined relationship, e.g., the patterns are the same, the patterns comprise circularly or cyclically shifted versions, and so forth. If the patterns have some defined relationship, then the candidate window is determined to define the boundaries of a tile. Otherwise, the candidate window may be shifted by one symbol location in one of two dimensions and the process repeated. Under certain types of inter-tile perturbations, it may not be necessary to establish tile boundaries, since any contiguous selection of symbols the size of a tile can be converted into a standard form via shifts in cyclic value or circular position.

In the case where there are circularly shifted versions of a pattern from one tile to the next, or within a single tile, the phase of the original string from which the pattern is derived must be known in order to recover the original string at block 830. In one example, this information may be provided out-of-band, e.g., using one or more special markers that are not part of the M-ary cyclic symbol set. Thus, in one example, this out-of-band information may be captured at block 810 and detected at block 820. However, in another example, one of the modifications to the pattern, either inter-tile or intra-tile, may be utilized to convey the phase shift required to recover the original form of the string from circularly shifted versions of the string. When not used to convey circular phase shift information, any one or more modifications of the pattern, either inter-tile or intra-tile, may be utilized to convey various other types of information, such as authentication and security information, an error correction code, a version number of a document, and so forth. In addition, these modifications, and the values of such modifications, may all be detected as part of the operations of block 820. In another example, the out-of-band symbols may be defined by a subset of symbols in the M-ary set.

At block 830, the processor translates the first plurality of symbols into a second plurality of symbols selected from a second set of symbols. In one example, block 830 comprises translating a standard form of a string of M-ary symbols to an original string using phase offset information determined at block 820. In one example, the second plurality of symbols comprises base-M numeric symbols. Thus, the first plurality of symbols may be translated from an M-ary cyclic symbol set into a numeric base-M representation. In one example, the numeric-base-M representation may be further translated to a symbol set of another base, such as a base-2 symbol set. In other words, the second plurality of symbols may comprise binary ones and zeros. In still another example, the second plurality of symbols may comprise American Standard Code for Information Interchange (ASCII) characters. For instance, the first plurality of symbols comprising an M-ary cyclic symbol set may be subject to multiple translations, e.g., from M-ary cyclic symbols into numeric base-M, from base-M to base-2, and from base-2 to ASCII character set. In one example, where the second plurality of symbols comprises ASCII characters, the second plurality of symbols may comprise structured data such as a computer-readable script, snippet of code, or various parameters that may be used to cause a computing device to perform one or more tasks.

At block 840, the processor performs at least one task responsive to the first plurality of symbols. For example, where the second plurality of symbols comprises ASCII characters, the second plurality of symbols may comprise any type of structured data such as a computer-readable script, snippet of code, or various parameters that may be used to cause a computing device to perform one or more tasks. In another example, the second plurality of symbols may comprise an authentication code, which may cause the processor, or another computing device to grant or deny access to a feature depending upon the second plurality of symbols. In still another example, the second plurality of symbols may comprise an Internet Protocol (IP) address, a uniform resource locator (URL), or the like. Thus, in one example, the processor may seek to access at least one resource over a network based upon an identifier contained in the second plurality of symbols. The foregoing are just several examples of the types of tasks that may be implemented in accordance with the method 800. Thus, in other, further, and different examples, block 840 may comprise a number of additional tasks that may be performed depending upon the particular system and purpose of the encoding of the second plurality of symbols to the surface using the first plurality of symbols selected from an M-ary cyclic symbol set. Following block 840, the method 800 proceeds to block 895 where the method ends.

It should be noted that although not explicitly specified, one or more blocks, functions, or operations of the method 700 or the method 800 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 7 and 8 that recite a determining operation, or involve a decision, do not necessarily require that both branches of the determining operation be practiced. In other words, one of the branches of the determining operation can be deemed as an optional step.

FIG. 9 depicts a high-level block diagram of a computing device suitable for use in performing the functions described herein. As depicted in FIG. 9, the system 900 comprises one or more hardware processor elements 902 (e.g., a central processing unit (CPU), a microprocessor, or a multi-core processor), a memory 904 (e.g., random access memory (RAM) and/or read only memory (ROM)), a module 905 for writing a plurality of M-ary cyclic symbols to a surface or for capturing a plurality of M-ary cyclic symbols from a surface, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 700 or the method 800 discussed above is implemented in a distributed or parallel manner for a particular illustrative example, i.e., the blocks of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 902 can also be configured or programmed to cause other devices to perform one or more operations as discussed above. In other words, the one or more hardware processors 902 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer-readable instructions pertaining to the methods discussed above can be used to configure a hardware processor to perform the steps, functions and/or operations (e.g., the "blocks") of the above disclosed methods. In one example, instructions and data for the present module or process 905 for writing a plurality of M-ary cyclic symbols to a surface or for capturing a plurality of M-ary cyclic symbols from a surface (e.g., a software program comprising computer-executable instructions) can be loaded into memory 904 and executed by hardware processor element 902 to implement the steps, functions or operations as discussed above in connection with the method 700 and the method 800 respectively. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 905 for writing a plurality of M-ary cyclic symbols to a surface or for capturing a plurality of M-ary cyclic symbols from a surface (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made.

What is claimed is:

1. A method, comprising:
receiving, by a processor, a first plurality of symbols selected from a first set of symbols;
translating, by the processor, the first plurality of symbols into a second plurality of symbols selected from an M-ary cyclic symbol set, wherein the second plurality of symbols is written such that a phase shift is detectable by a comparison of rows of the second plurality of symbols to detect a standard form of the second plurality of symbols; and
writing, by the processor, the second plurality of symbols to a surface.

2. The method of claim 1, wherein the writing comprises forming a two-dimensional array of tiles on the surface, wherein each tile comprises a two-dimensional pattern of symbols, wherein the writing comprises writing the second plurality of symbols in an arrangement that forms the two-dimensional pattern of symbols in each tile.

3. The method of claim 2, wherein, for at least one tile, the two-dimensional pattern of symbols comprises a modified version of the two-dimensional pattern of symbols in another tile.

4. The method of claim 3, wherein the writing comprises: applying a systematic modification of a pattern to each tile in the two-dimensional array of tiles, wherein the systematic modification of the pattern comprises at least one two-dimensional circular transformation of the arrangement of the second plurality of symbols.

5. The method of claim 3, wherein the writing comprises:
applying a systematic modification of a pattern to each tile in the two-dimensional array of tiles, wherein the systematic modification of the pattern comprises at least one cyclical shift in values of the second plurality of symbols in the pattern.

6. The method of claim 5, wherein the at least one cyclical shift comprises an integer multiple of a difference between two values in the M-ary cyclic symbol set.

7. The method of claim 5, wherein the at least one cyclical shift comprises an angular shift to a non-integer multiple of a difference between two value in M-ary cyclic symbol set.

8. An apparatus, comprising:
a processor; and
a computer-readable medium storing instructions which, when executed by the processor, cause the processor to:
receive a first plurality of symbols selected from a first set of symbols;
translate the first plurality of symbols into a second plurality of symbols selected from an M-ary cyclic symbol set, wherein the second plurality of symbols is written such that a phase shift is detectable by a comparison of rows of the second plurality of symbols to detect a standard form of the second plurality of symbols; and
write the second plurality of symbols to a surface.

9. The apparatus of claim 8, wherein the M-ary cyclic symbol set comprises an ordered set of M symbols, where the M symbols represent samples from a cyclic space, where positions of the M symbols in a cyclically ordered set increase monotonically and return to a starting value after reaching an M-th value.

10. The apparatus of claim 9, wherein the ordered set of the M symbols comprises:
symbols represented by colors;
symbols represented by sizes of an icon;
symbols represented by positions of an icon;
symbols represented by slopes of a line; or
symbols represented by alphanumeric glyphs.

11. The apparatus of claim 9, where the cyclic space comprises value differences in another cyclic space.

12. The apparatus of claim 11, wherein the set of the M symbols comprises: symbols represented by color differences;
symbols represented by differences in size;
symbols represented by differences in position; or
symbols represented by differences in slope.

13. The apparatus of claim 11, wherein the value differences include non-rational partitions of the cyclic space.

* * * * *